(12) United States Patent
Zhang

(10) Patent No.: US 10,871,190 B2
(45) Date of Patent: Dec. 22, 2020

(54) SLIDING BEARING AND A METHOD FOR PREPARING THE SAME

(71) Applicant: COB PRECISION PARTS INC., Zhejiang (CN)

(72) Inventor: Guoqiang Zhang, Zhejiang (CN)

(73) Assignee: COB Precision Parts Inc., Zhejiang (CN)

( * ) Notice: Subject to any disclaimer, the term of this patent is extended or adjusted under 35 U.S.C. 154(b) by 0 days.

(21) Appl. No.: 16/505,946

(22) Filed: Jul. 9, 2019

(65) Prior Publication Data

US 2020/0200219 A1 Jun. 25, 2020

(30) Foreign Application Priority Data

Dec. 25, 2018 (CN) .......................... 2018 1 1589887

(51) Int. Cl.
*F16C 33/20* (2006.01)

(52) U.S. Cl.
CPC .......... *F16C 33/206* (2013.01); *F16C 33/201* (2013.01); *F16C 33/208* (2013.01); *F16C 2208/04* (2013.01); *F16C 2208/32* (2013.01); *F16C 2208/60* (2013.01)

(58) Field of Classification Search
CPC ........................................... F16C 33/201–208
See application file for complete search history.

(56) References Cited

U.S. PATENT DOCUMENTS

| 6,863,994 B2* | 3/2005 | Tanaka ................. F16C 33/201 |
| | | 428/626 |
| 8,931,957 B2 | 1/2015 | Hardgrave et al. |
| 10,458,360 B2* | 10/2019 | Fukutomi ............ F16C 33/201 |
| 2012/0128280 A1 | 5/2012 | Ortiz et al. |
| 2018/0050517 A1* | 2/2018 | Nguyen ................ F16C 33/201 |

FOREIGN PATENT DOCUMENTS

| CN | 101715392 B | 10/2013 |
| CN | 102510957 B | 8/2015 |
| CN | 103270327 B | 6/2016 |
| CN | 103502665 B | 11/2016 |
| EP | 1 245 657 A1 | 10/2002 |
| EP | 3 330 581 A1 | 6/2018 |
| WO | WO 2014/049137 A1 | 4/2014 |

OTHER PUBLICATIONS

European Search Report received for EP Application No. 19177738.2-1013, dated Nov. 26, 2019.

* cited by examiner

*Primary Examiner* — James Pilkington
(74) *Attorney, Agent, or Firm* — Finnegan, Henderson, Farabow, Garrett & Dunner, LLP

(57) ABSTRACT

A sliding bearing includes a backing layer, a bonding layer with at least one fluorination-treated surface, and a sliding layer. A method for preparing the sliding bearing includes performing a fluorination treatment on a surface of the bonding layer, placing a surface of the bonding layer on a surface of the backing layer, and placing a surface of the sliding layer on a surface of the bonding layer to form a laminated assembly, heating and pressurizing the laminated assembly, and cooling the laminated assembly in a pressurized state.

19 Claims, 4 Drawing Sheets

|  |  | Embodiment 1 | Embodiment 2 | Embodiment 3 | Embodiment 4 | Embodiment 5 | Embodiment 6 | Embodiment 7 | Embodiment 8 | Comparable example 1 | Comparable example 2 | Comparable example 3 |
|---|---|---|---|---|---|---|---|---|---|---|---|---|
| Backing layer | Composition | Low carbon steel plate | Low carbon steel plate | Low carbon steel plate | Low carbon steel plate | Low carbon steel plate | Low carbon steel plate | Low carbon steel plate | Low carbon steel plate | Low carbon steel plate | Low carbon steel plate | Low carbon steel plate |
|  | Thickness (mm) | 0.5 | 0.5 | 0.25 | 0.25 | 0.25 | 0.5 | 0.5 | 0.5 | 0.5 | 0.5 | 0.5 |
|  | Surface roughness degree (μm) | 2.0 | 2.0 | 1.6 | 1.6 | 1.6 | 2.0 | 2.0 | 2.0 | 2.0 | 2.0 | 2.0 |
| Bonding layer | Thermoplastic resin/phr | Polypropylene/90 | Polyphenylene sulfide/100 | Polyphenylene sulfide/100 | Polyphenylene sulfide/100 | Polyphenylene sulfide/100 | Polyamide 6/98 | Polyurethane/98 | Polyurethane/90 | Polyurethane/90 | Polyphenylene sulfide/100 | Ethylene-tetrafluoro-ethylene copolymer/100 |
|  | First filler/phr | Maleic anhydride grafted polypropylene/10 | - | - | - | - | Graphite/2 | Silicon dioxide/2 | Maleic anhydride grafted polypropylene/10 | Maleic anhydride grafted polypropylene/10 | - | - |
|  | Thickness (mm) | 0.03 | 0.02 | 0.02 | 0.045 | 0.02 | 0.045 | 0.05 | 0.03 | 0.03 | 0.02 | 0.05 |
| Fluorination treatment | Number of surfaces | 2 | 1 | 1 | 1 | 1 | 2 | 2 | 2 | 0 | 0 | 0 |
|  | Depth (μm) | 2 | 2 | 5 | 15 | 0.1 | 2 | 2 | 2 | - | - | - |
|  | Fluorine concentration (%) | 20 | 10 | 22 | 19 | 5 | 20 | 20 | 52 | - | - | - |
| Sliding layer | Polytetrafluoroethylene/phr | 95 | 75 | 75 | 75 | 75 | 95 | 95 | 95 | 95 | 75 | 75 |
|  | Second filler/phr | Graphite/5 | Molybdenum disulfide/5+ silicon carbide/20 | Molybdenum disulfide/5+ silicon carbide/20 | Molybdenum disulfide/5+ silicon carbide/20 | Molybdenum disulfide/5+ silicon carbide/20 | Graphite/5 | Graphite/5 | Graphite/5 | Graphite/5 | Molybdenum disulfide/5+ silicon carbide/20 | Molybdenum disulfide/5+ silicon carbide/20 |
|  | Thickness (mm) | 0.5 | 0.3 | 0.3 | 0.3 | 0.3 | 0.5 | 0.5 | 0.5 | 0.5 | 0.3 | 0.3 |
| Assessment | Peel strength (N/mm) | 1.32 | 3.24 | 3.52 | 3.10 | 2.84 | 2.12 | 3.53 | 1.54 | 0.58 | 1.07 | 1.98 |

FIG. 4

SLIDING BEARING AND A METHOD FOR PREPARING THE SAME

This application claims the benefit of priority of Chinese Patent Application No. 201811589887.7, filed Dec. 25, 2018, which is incorporated herein in its entirety by reference.

FIELD OF THE DISCLOSURE

The present disclosure relates to the technical field of sliding bearings and relates to a sliding bearing comprising a fluorination-treated bonding layer and a method for preparing the same.

BACKGROUND OF THE DISCLOSURE

A sliding bearing refers to a bearing working under sliding friction. Frequently-used materials of sliding bearings include bearing alloy, abrasion resistant cast iron, copper base and aluminum base alloys, powder metallurgy material, plastics, rubber, hardwood, carbon graphite, polytetrafluoroethylene, and modified polyformaldehyde. Sliding bearings made of polytetrafluoroethylene are self-lubricating without the presence of other lubricant and have been widely used for its advantages over metallic sliding bearings, such as low energy consumption, low friction coefficient, and higher safety. Normally, polytetrafluoroethylene is used as the sliding layer of a sliding bearing to provide excellent lubrication and by combination with the backing layer of metal, to enhance the loading ca parity of the bearing. However, polytetrafluoroethylene has a very low polarity and a special technique is required to provide effective combination with the backing layer of metal so as to meet the requirement of use of the bearing.

A common method for effective combination between polytetrafluoroethylene and the backing layer of metal is mentioned in U.S. Pat. No. 8,931,957 B2 as follows: sintering a porous copper powder layer on a metal substrate as a bonding layer, on which polytetrafluoroethylene or a mixture thereof is laid; under heat and pressure, the polytetrafluoroethylene is pressed into pores in the porous copper powder layer and forms with the metallic backing layer a consolidated structure after curing. However, this method is relatively complicated, and the use of copper powder influences the economic efficiency of the product. In addition, it is also mentioned in Chinese patents Nos. 101715392 B and 103502665 B, as well as in an international patent application published as WO 2014/049137 A1, that a bonding agent mainly comprising a fluoride polymer is used to bond a polytetrafluoroethylene sliding layer and a metallic backing layer. However, production of fluoride polymers is adverse to the environment while the use of fluoropolymer influences the economic efficiency of the product.

SUMMARY OF THE DISCLOSURE

The present disclosure overcomes drawbacks in the prior art by providing a sliding bearing comprising a fluorination-treated bonding layer and a method for preparing the same. In some embodiments, the sliding bearing according to the present disclosure employs normal fluoride-free thermoplastic films of a lower cost, as the major component of the bonding layer with fluorination treatment on the surface of the bonding layer, maintains bonding strength with a lower content of fluoride in the bonding layer, and a lower cost of raw materials and smaller impact to the environment.

In some embodiments, the sliding bearing according to the present disclosure comprises:

a backing layer comprising a first surface and a second surface on the back of the first surface;

a bonding layer covering the backing layer and comprising a first bonding surface in contact with the second surface of the backing layer and a second bonding surface on the back of the first bonding surface;

a sliding layer covering the bonding layer and comprising a first surface in contact with the second bonding surface of the bonding layer and a second surface on the back of the first surface of the sliding layer, wherein the bonding layer comprises fluorine-free thermoplastic resin and at least comprises a fluorination-treated layer formed by a fluorination treatment on the second bonding surface;

the sliding layer comprises polytetrafluoroethylene.

In some embodiments, the bonding layer further comprises a fluorination-treated layer formed by a fluorination treatment on the first bonding surface.

In some embodiments, the fluorination-treated layer has a depth of 0.001~50 μm.

In some embodiments, the fluorination-treated layer has a depth of 0.1~15 μm.

In some embodiments, the thermoplastic resin is selected from one or more of polyethylene, polypropylene, ethylene-vinyl acetate copolymer, polyurethane, polyamide, polyethylene terephthalate, polybutylene terephthalate, and polyphenylene sulfide. In one embodiment, fluorine in the fluorination-treated layer has a relative atomic concentration of 1~80% and the concentration of the fluorine is obtained through analysis by an X-ray photoelectron spectrometer.

In one embodiment, the fluorine has a relative atomic concentration of 5~52%.

In some embodiments, the thermoplastic resin has a melting point of 330° C. or lower.

In some embodiments, the thermoplastic resin is selected from one or more of polyethylene, polypropylene, ethylene-vinyl acetate copolymer, polyurethane, polyamide, polyethylene terephthalate, polybutylene terephthalate, and polyphenylene sulfide.

In some embodiments, the thermoplastic resin is selected from one or more of ethylene-vinyl acetate copolymer, polyurethane, polyamide, and polyphenylene sulfide.

In some embodiments, mass fraction of the thermoplastic resin in the bonding layer is 40~100%.

In some embodiments, the bonding layer further comprises a first filler selected from a graft modified polymer, inorganic powder or a combination thereof, the graft modified polymer being selected from one or more of anhydride grafted polyethylene, anhydride grafted polypropylene and acrylate grafted polypropylene, the inorganic powder being selected from one or more of graphite, graphene, carbon nano tube, and silicon dioxide.

In some embodiments, the bonding layer has a thickness of 0.005~0.1 mm.

In some embodiments, the bonding layer has a thickness of 0.02~0.06 mm.

In some embodiments, mass fraction of the polytetrafluoroethylene in the sliding layer is 20~100%.

In some embodiments, mass fraction of the polytetrafluoroethylene in the sliding layer is 60~90%.

In some embodiments, the sliding layer further comprises a second filler selected from solid lubricants, abrasion resistance improvers, reinforcements, polymers or a mixture thereof, the solid lubricants being selected from one or more of graphite, graphite fluoride, graphene, carbon nano tube, molybdenum disulfide and tungsten disulfide, the abrasion resistance improvers being selected from one or more of copper, plumbum, copper sulfide, zinc sulfide, barium sulfate, ferric sulfide, chromium oxide, aluminum oxide, zirconium oxide, silicon carbide, silicon nitride, boron nitride and glass beads, the reinforcements being selected from one or more of glass fibers, carbon fibers, aramid fibers, polyether-ether-ketone fibers and polyimide fibers, the polymers being selected from one or more of polyamide, polyphenyl ester, polyphenylene sulfide, polyether ether ketone, polyimide, polyamide-imide, polyvinylidene fluoride, ethylene-tetrafluoroethylene copolymer, fluorinated ethylene-propylene copolymer, and tetrafluoroethylene-perfluoalkoxyvinyl ether copolymer.

In some embodiments, the first surface of the sliding layer is a surface subject to surface treatment.

In some embodiments, the surface treatment includes chemical modification treatment, plasma treatment, corona treatment, flame treatment, and laser radiation treatment.

The present disclosure further provides a method for preparing the sliding bearing, wherein the method comprises:

performing the fluorination treatment on at least the second bonding surface of the bonding layer;

placing the first bonding surface of the bonding layer on the second surface of the backing layer and then placing the first surface of the sliding layer on the second bonding surface of the bonding layer to form a laminated assembly;

heating and pressurizing the laminated assembly; and cooling the laminated assembly in a pressurized state.

The present disclosure is advantageous in the following aspects: the present disclosure employs normal fluoride-free thermoplastic films of a lower cost as the major component of the bonding layer with fluorination treatment on the surface of the fluorine-free bonding layer within a certain depth, so as to increase the content of fluorine in the surface of the bonding layer, its surface energy and its compatibility with the sliding layer. In some embodiments, the effective combination between the sliding layer and the backing layer is ensured, and the employed bonding layer only comprises normal thermoplastic resin containing a suitable amount of fluorine within a certain depth, providing lower cost of use as compared to expensive bonding layers made of fluoropolymer and smaller impact to the environment due to the lower content of fluorine in the bonding layer.

BRIEF DESCRIPTION OF THE DRAWINGS

FIG. 4 shows the Comparable examples according to the present disclosure.

DESCRIPTION OF THE EMBODIMENTS

Figure 1:
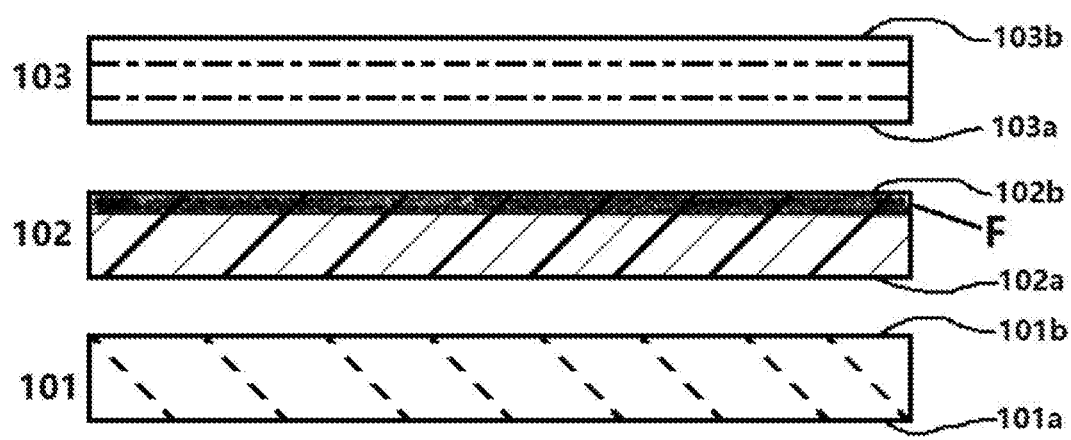
FIG. 1 is an enlarged cross-sectional view of one embodiment of the sliding bearing according to the present disclosure.

The present disclosure will now be explained in detail with reference to specific examples, but the scope of protection of the present disclosure will not be limited to these examples. Any variation or substitution that a person skilled in the art will easily anticipate within the disclosure of the present disclosure shall be covered by the present disclosure. Therefore, the scope of protection of the disclosure shall be determined based on the scope of protection of the claims.

Explanations and clarifications will now be made on some terms and symbols used in the present disclosure.

When used in the present disclosure, the term 'thermoplastic resin' shall refer to a resin having a property of softening when heated and hardening when cooled without any chemical reaction and maintaining the property regardless of number of times of heating and cooling performed. During formation processing, a thermoplastic resin softens and flows when pressurized and heated without causing chemical crosslinking, and is shaped in a mold to form a product of desired shape after cooling. During repeated heating, it endures generally no change in molecular structure but is degraded or decomposed when the temperature is too high or being heated for too long.

When used in the present disclosure, the term 'Melting point'(Tm) refers to the temperature at which the thermoplastic resin is fused. Here, it refers to the temperature at which the thermoplastic resin being solid at room temperature is melted in heat into liquid (or 'a fused state').

When used in the present disclosure, the term 'fluorination treatment' refers to a treatment of modifying the surface of a substrate so as to increase content of fluorine and surface energy of the surface of the substrate. In some embodiments, fluorination treatment can be carried out in known ways in the art, such as radiation grafting, plasma activation, chemical etching, and electrostatic spraying. The present disclosure is not limited to these ways. Any method that enables the substrate to include a suitable amount of fluorine within a certain depth from the surface can be applied to the present disclosure.

When used in the present disclosure, the term 'roughening treatment' refers to processing on the surface of a substrate to form uneven structure on the surface so as to increase the adhesive force of the substrate. All known methods for roughening treatment, including, but not limited to, sand papering, sand blasting, and chemical etching can be applied to the present disclosure.

When used in the present disclosure, the term 'surface roughness' refers to small gap and unevenness of small peak and trough of the surface of a substrate which has received roughening treatment. The smaller the surface roughness is, the smoother the surface is. Ra is a unit of measurement of surface roughness called arithmetical mean deviation of the profile or center line average, and is an arithmetical mean value of the height of each point on the profile within the scope of measurement length. The surface roughness Ra in the present disclosure is measured by a surface roughometer.

When used in the present disclosure, the term 'surface treatment' refers to a processing on the surface of a substrate to improve its surface activity so as to enhance adhesion of the substrate. All known methods capable of improving surface activity of the sliding layer, including, but not limited to, chemical modification treatment, plasma treatment, corona treatment, flame treatment, and laser radiation treatment can be applied to the present disclosure.

Figure 2:
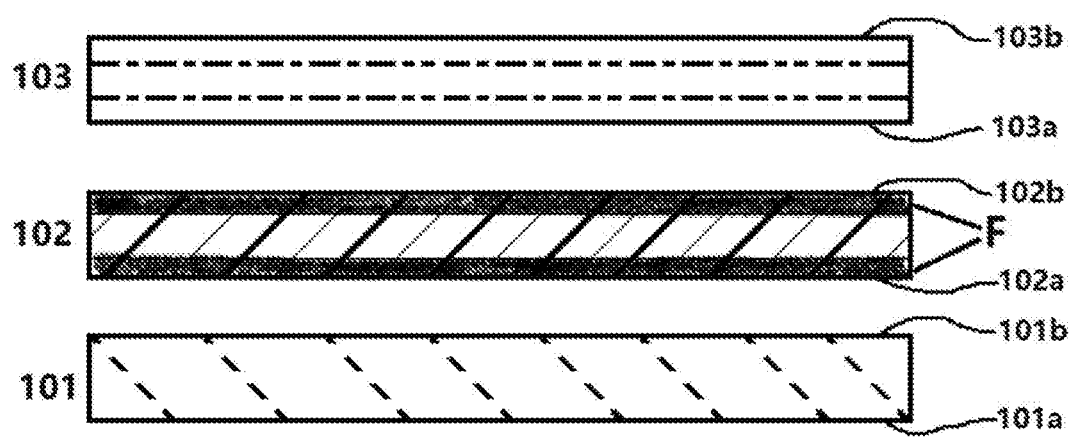
FIG. 2 is another enlarged cross-sectional view of one embodiment of the sliding bearing according to the present disclosure.

FIG. 1 shows an enlarged cross-sectional view of one embodiment of the sliding bearing according to the present disclosure. In this embodiment, the sliding bearing according to the present disclosure comprises a backing layer 101, a bonding layer 102 and a sliding layer 103, wherein the backing layer 101 comprises a first surface 101a and a second surface 101b on the back of the first surface 101a; the bonding layer 102 covers the backing layer 101 and comprises a first bonding surface 102a in contact with the second surface 101b of the backing layer 101 and a second bonding surface 102b on the back of the first bonding surface 102a; In some embodiments, fluorination treatment is carried out on the second bonding surface 102b so that the bonding layer 102 includes a fluorination-treated layer F on the second bonding surface 102b side. The sliding layer 103 covers the bonding layer 102 and comprises a first surface 103a in contact with the second bonding surface 102b of the bonding layer 102 and a second surface 103b on the back of the first surface 103a. In one embodiment, the bonding layer 102 is composed mainly of fluorine-free thermoplastic resin with fluorination treatment on the second bonding surface 102b in contact with the sliding layer 103. In some embodiments, the formed fluorination-treated layer F increases the content of fluorine and surface energy of the surface of the bonding layer 102 in contact with the sliding layer 103, and further enhances its compatibility with the polytetrafluoroethylene sliding layer. As compared to a bonding layer without fluorination treatment, the bonding strength between the bonding layer 102 and the sliding layer 103 is significantly enhanced. And, as fluorination treatment is only carried out on the surface of the bonding layer, the cost of use is lowered and impact to the environment is minimized as compared to a bonding layer formed of fluoropolymer. As compared to the embodiment as shown in FIG. 2 of the present disclosure in which fluorination treatment is carried out on both surfaces of the bonding layer, the present embodiment in which the fluorination treatment is carried only on the second bonding surface 102b can maintain the bonding strength of the sliding layer while further lowering the overall fluorine content, reducing cost and minimizing impact to the environment. Composition of each layer and parameters such as thickness of the present embodiment will be explained in detail in the following paragraphs.

FIG. 2 shows an enlarged cross-sectional view of another embodiment of the sliding bearing according to the present disclosure. In this embodiment, the sliding bearing according to the present disclosure comprises a backing layer 101, a bonding layer 102, and a sliding layer 103, wherein the backing layer 101 comprises a first surface 101a and a second surface 101b on the back of the first surface 101a; the bonding layer 102 covers the backing layer 101 and comprises a first bonding surface 102a in contact with the second surface 101b of the backing layer 101, and a second bonding surface 102b on the back of the first bonding surface 102a. In some embodiments, fluorination treatment is carried out on both of the first bonding surface 102a and the second bonding surface 102b so that the bonding layer 102 includes fluorination-treated layers F on both of the first bonding surface 102a side and the second bonding surface 102b side. In some embodiments, the sliding layer 103 covers the bonding layer 102 and comprises a first surface 103a in contact with the second bonding surface 102b of the bonding layer 102 and a second surface 103b on the back of the first surface 103a. In one embodiment, the bonding layer 102 is composed mainly of fluorine-free thermoplastic resin with fluorination treatment on both surfaces of the bonding layer 102. In some embodiments, the formed fluorination-treated layers F increase the content of fluorine and surface energy of the surface of the bonding layer 102 in contact with the sliding layer 103, and further enhance its compatibility with the polytetrafluoroethylene sliding layer. As compared to a bonding layer without fluorination treatment, the bonding strength between the bonding layer 102 and the sliding layer 103 is significantly enhanced. And, as fluorination treatment is only carried out on the surface of the bonding layer, the cost of use is lowered and impact to the environment is minimized as compared to a bonding layer formed of fluoropolymer. As compared to the embodiment as shown in FIG. 1 of the disclosure, in this embodiment in which fluorination treatment is carried out on both surfaces of the bonding layer, it simplifies the production process. Composition of each layer and parameters such as thickness of the this embodiment will be explained in detail in the following paragraphs.

Backing Layer

In one embodiments, the backing layer 101 according to the disclosure is made of metal. In some embodiments, the metal can be selected from, for example, low carbon steel, stainless steel, aluminum, copper or their alloys.

In one embodiments, the second surface 101b of the backing layer 101 can be roughened to increase, for example, adhesion of the backing layer 101 to the bonding layer 102. In one embodiment, roughening methods are selected from known methods in the art, such as sand papering, sand blasting, and chemical etching. In some embodiments, after the second surface 101b of the backing layer 101 is roughened, its surface roughness Ra is, for example, 0.1~10 μm. In some embodiments, Ra=1~5 μm. The surface roughness Ra is measured by a surface roughometer (Mitutoyo SJ-310).

In some embodiments, the thickness of the backing layer 101 can be configured as needed, such as 0.1~2 mm.

Bonding Layer

In some embodiments, the bonding layer 102 of the present application is made of fluorine-free thermoplastic resin. In other embodiments, the bonding layer 102 can further comprise, for example, a filler.

In some embodiments, the fluorine-free thermoplastic resin used in the bonding layer 102 according to the disclosure has, for example, a melting point (Tm) which is not higher than 330° C. In one embodiment, the thermoplastic resin can be selected from one or more of polyethylene, polypropylene, ethylene-vinyl acetate copolymer, polyurethane, polyamide, polyethylene terephthalate, polybutylene terephthalate, and polyphenylene sulfide. For the purpose of better adhesion, the thermoplastic resin can be one or more of ethylene-vinyl acetate copolymer, polyurethane, polyamide and polyphenylene sulfide.

In some embodiments, the filler used in the disclosure may include a graft modified polymer, inorganic powder or a combination thereof. In one embodiment, the graft modified polymer can be selected from one or more of anhydride grafted polyethylene, anhydride grafted polypropylene, and acrylate grafted polypropylene. In some embodiments, the inorganic powder can be selected from one or more of graphite, graphene, carbon nano tube, and silicon dioxide.

In one embodiment of the disclosure, the mass fraction of the thermoplastic resin in the bonding layer 102 is 40~100%. Within said mass fraction, not only is the bonding strength of the bonding layer excellent, but also the bonding layer film has good ductility and malleability for subsequent forming process of the bearings.

In some embodiments, the thickness of the bonding layer 102 can be, for example, 0.005~0.1 mm. In some embodiments, the bonding layer 102 has a thickness of 0.02~0.06 mm. When the thickness of the bonding layer 102 is 0.005~0.1 mm, its bonding strength is excellent, and the cost is lower.

In some embodiments, the method for carrying out fluorination treatment on the bonding layer 102 is performed via known methods of fluorination treatment in the art. In some embodiments, the following methods can be used: radiation grafting, plasma activation, chemical etching, and electrostatic spraying.

In some embodiments, the depth of the fluorination-treated layer F of the bonding layer 102 can be set freely based on, for example, the environment of use and bonding strength of the bearing. In one embodiment, the depth of the fluorination-treated layer F is 0.001~50 μm. In some embodiments, the depth of the fluorination-treated layer F is 0.1~15 μm. When the depth of the fluorination-treated layer F is 0.001~50 μm, the bonding layer 102 has excellent bonding strength, the fluorination process is less difficult, and the cost is lower. In some embodiments, the relative atomic concentration of fluorine in the fluorination-treated layer F of the bonding layer 102 is sufficient to enhance compatibility between the bonding layer and the sliding layer. In one embodiment of the disclosure, the relative atomic concentration of fluorine in the fluorination-treated layer F is 1~80%. In some embodiments, the relative atomic concentration of fluorine is 5~52%. When the relative atomic concentration of fluorine is 1~80%, not only is the bonding strength of the bonding layer 102 excellent, but also the cost is lower and the impact to environment is minimized. In the present disclosure, the depth of the fluorination-treated layer and the relative atomic concentration of fluorine are obtained by Ar etching depth profiling with X-ray photoelectron spectroscopy (XPS). The device used is ESCALAB MK II electronic spectrometer (VG, UK), with Mg Kα X ray as excitation source (Ex energy: 1253.6ec), a power of 12 KV×20 mA and an analyzer pass energy of 20 eV. The depth profiling is carried out by Ar etching, with a vacuum energy of $3 \times 10^{-6}$ mbAr, acceleration voltage of 2.5 KV and current of 40 μA.

Sliding Layer

In some embodiments, the sliding layer 103 of the present disclosure is mainly composed of polytetrafluoroethylene and its mass fraction could be an empirical value in the art. In one embodiment, the mass fraction of the polytetrafluoroethylene is 20~100%. In some embodiments, the mass fraction of the polytetrafluoroethylene is 60~90%. When the mass fraction of the polytetrafluoroethylene in the sliding layer 103 is 20~100%, the sliding layer has a low friction coefficient, excellent abrasion resistance, and lower cost.

In some embodiments, the sliding layer 103 of the present disclosure may further comprise, for example, a filler. In one embodiment, the filler can be selected from solid lubricants, abrasion resistance improvers, reinforcements, polymers or a mixture thereof. In some embodiments, the solid lubricants can be selected from one or more of graphite, graphite fluoride, graphene, carbon nano tube, molybdenum disulfide, and tungsten disulfide. In some embodiments, the abrasion resistance improvers can be selected from one or more of copper, plumbum, copper sulfide, zinc sulfide, barium sulfate, ferric sulfide, chromium oxide, aluminum oxide, zirconium oxide, silicon carbide, silicon nitride, boron nitride, and glass beads. In some embodiments, the reinforcements can be selected from one or more of glass fibers, carbon fibers, aramid fibers, polyether-ether-ketone fibers, and polyimide fibers. In some embodiments, the polymers can be selected from one or more of polyamide, polyphenyl ester, polyphenylene sulfide, polyether ether ketone, polyimide, polyamide-imide, polyvinylidene fluoride, ethylene-tetrafluoroethylene copolymer, fluorinated ethylene-propylene copolymer, and tetrafluoroethylene-perfluoalkoxyvinyl ether copolymer.

In one embodiment, the first surface 103a of the sliding layer 103 of the present disclosure is surface treated in advance so as to increase the adhesive force of the sliding layer 103 to the bonding layer 102. In some embodiments, the surface treatment method can be selected from chemical modification treatment, plasma treatment, corona treatment, flame treatment, and laser radiation treatment.

In some embodiments, the thickness of the sliding layer 103 can be configured as needed, such as 0.01~10 mm. In some embodiments, the thickness is 0.1~1 mm. In one embodiment, when the thickness of the sliding layer 103 is 0.01~10 mm, the sliding layer 103 has a longer service life, excellent bonding strength with the bonding layer 102, and a lower cost.

Preparation of the Sliding Bearing

Figure 3:
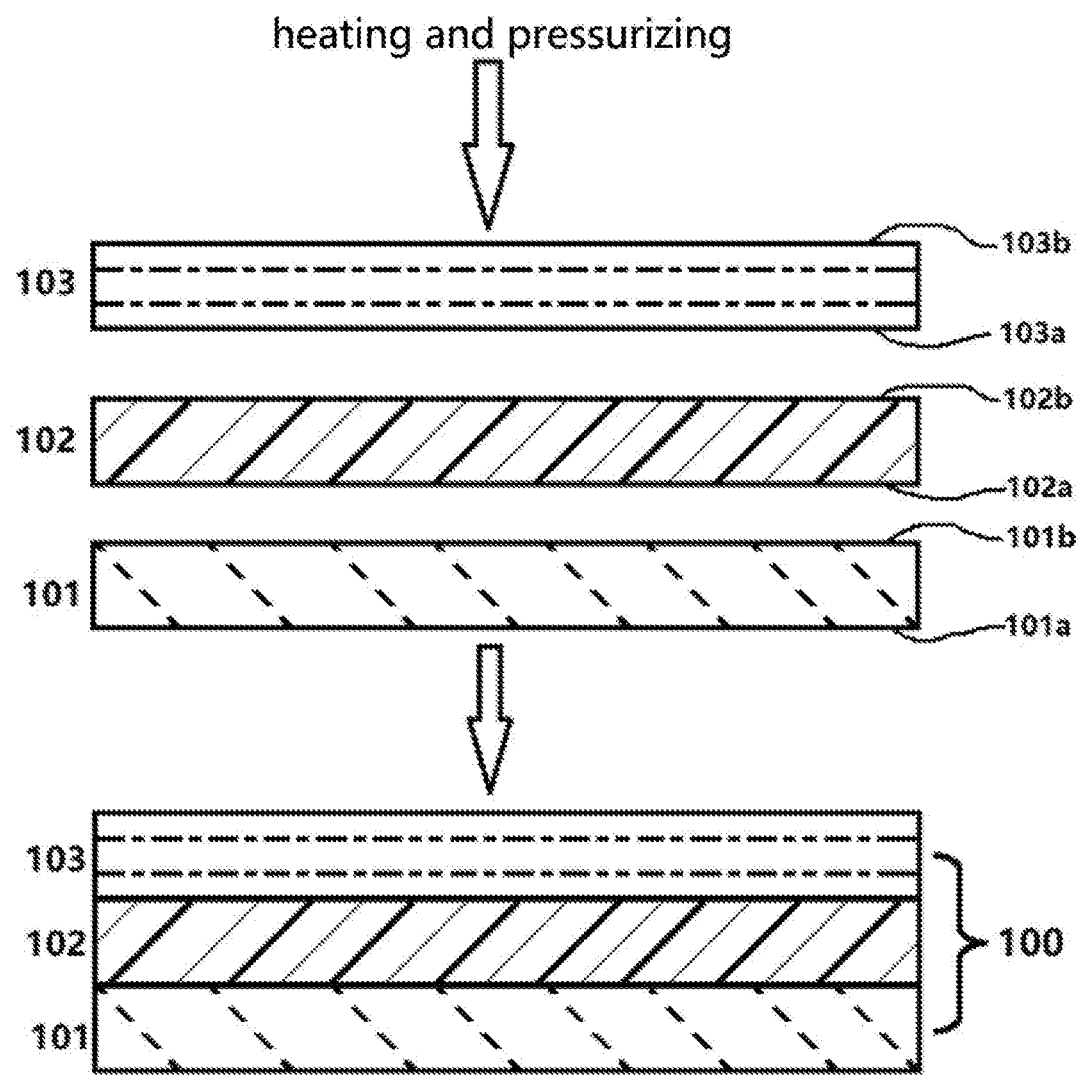
FIG. 3 is a schematic view of a method for preparing the sliding bearing according to the present disclosure.

As shown in FIG. 3, a hot-pressing molding method is used to prepare the sliding bearing according to the present disclosure by heating and pressurizing the backing layer 101, the bonding layer 102 and the sliding layer 103, and the details are as follows:

(1) performing the fluorination treatment on at least the second bonding surface 102b of the bonding layer 102 to form a fluorination-treated layer F (not shown);

(2) placing the first bonding surface 102a of the bonding layer 102 on the second surface 101b of the backing layer 101; and then placing the first surface 103a of the sliding layer 103 on the fluorination-treated second bonding surface 102b of the bonding layer to form a laminated assembly;

(3) heating and pressurizing the laminated assembly 100; and (4) cooling the laminated assembly 100 in a pressurized state.

Then, the cooled laminated assembly 100 is prepared into a sliding bearing using a conventional forming method in the art.

In some embodiments, the sliding bearing can be prepared with appropriate hot-pressing parameters (e.g., pressure, temperature, time) that are chosen according to the layer composition, thickness and desired bond strength of the sliding bearing according to the present disclosure.

In some embodiments, the applied pressure could be, for example, 0.1~10 MPa. In one embodiment, the applied pressure is 0.5~2 MPa.

In some embodiments, the heating temperature can be any temperature above the melting point of the thermoplastic resin but no higher than 330° C. In some embodiments, the heating temperature is 30° C. above the melting point or lower. In one embodiment, the heating temperature is 10° C. above the melting point or lower.

In some embodiments, the time of heating and pressurizing can be 5~600 s. In some embodiments, the time of heating and pressurizing is 10~150 s. In one embodiment, when the time of heating and pressurizing is 5~600 s, the bonding strength between the bonding layer and the sliding layer is excellent.

In some embodiments, the laminated assembly 100 can be prepared into a sliding bearing using a conventional forming method in the art, such as rolling formation.

In some embodiments, the preparation method can also include, for example, a roughening treatment on the second surface 101b of the backing layer 101, and the method of the roughening treatment can employ any aforementioned method in the present disclosure.

In some embodiments, the above preparation method can further comprise a surface treatment on the first surface 103a of the sliding layer 103 in advance. In some embodiments, the treatment method may employ any aforementioned method in the present disclosure.

Peel Strength Testing

In some embodiments, the substrate 100 of the prepared sliding bearing is cut into bar-shaped samples with a width of 10 mm. In one embodiment, the sliding layer 103 and the backing layer 101 are peeled from each other at a speed of 20 mm/min, and a peel angle of 180°. A peel strength is obtained by dividing the biggest peel force recorded by an electric universal testing machine (SUNS UTM5105) by the width of the samples.

Embodiment

Embodiment 1

In one embodiment, the substrate of the sliding bearing is prepared according to the abovementioned methods in the embodiments, wherein
the backing layer 101 is a low carbon steel plate with a thickness of 0.5 mm, and
the surface roughness Ra of the roughening-treated second surface 101b of the
backing layer 101 is 2.0 μm.

In one embodiment, the bonding layer 102, is a polypropylene film of a thickness of 0.03 mm and comprising 10% (mass fraction) maleic anhydride grafted polypropylene. The fluorination treatment is performed on both the first bonding surface 102a and the second bonding surface 102b of the bonding layer with a 2 μm depth of fluorination treatment and a 20% fluorine concentration.

In one embodiment, the sliding layer 103, with a thickness of 0.5 mm, is a polytetrafluoroethylene membrane, 5% (mass fraction) of which is graphite. A sodium-naphthalene treatment is performed on the first surface 103a of the sliding layer 103.

In one embodiment, the peel strength between the prepared backing layer 101 and sliding layer 103 of the sliding bearing is 1.32 N/mm.

Embodiment 2

In one embodiment, the substrate of the sliding bearing is prepared according to the abovementioned methods in the embodiments, wherein:
the backing layer 101 is a low carbon steel plate with a thickness of 0.5 mm, and the surface roughness Ra of the roughening-treated second surface 101b of the backing layer 101 is 2.0 μm.

In one embodiment, the bonding layer 102 is a thermoplastic polyphenylene sulfide film that has a thickness of 0.02 mm. The fluorination treatment is performed on the second bonding surface 102b of the bonding layer 102 with a 2 μm depth of the fluorination treatment, and a 10% fluorine concentration.

In one embodiment, the sliding layer 103, with a thickness of 0.3 mm, is a polytetrafluoroethylene membrane, 5% (mass fraction) of which is molybdenum disulfide and 20% (mass fraction) of which is silicon carbide. A sodium-naphthalene treatment is performed on the first surface 103a of the sliding layer 103.

In one embodiment, the peel strength between the prepared backing layer 101 and sliding layer 103 of the sliding bearing is 3.24 N/mm.

Embodiment 3

In one embodiment, the substrate of the sliding bearing is prepared according to the abovementioned methods in the embodiments, wherein:
the backing layer 101 is a low carbon steel plate with a thickness of 0.25 mm, and the surface roughness Ra of the roughening-treated second surface 101b of the backing layer 101 is 1.6 μm.

In one embodiment, the bonding layer 102 is a thermoplastic polyphenylene sulfide film that has a thickness of 0.02 mm. The fluorination treatment is performed on the second bonding surface 102b of the bonding layer 102 with a 5 μm depth of the fluorination treatment and a 22% fluorine concentration.

In one embodiment, the rest of Embodiment 3 is the same as Embodiment 2. The peel strength between the prepared backing layer 101 and sliding layer 103 of the sliding bearing is 3.52 N/mm.

Embodiment 4

In one embodiment, the thickness of the bonding layer 102 is 0.045 mm, the depth of the fluorination treatment is 15 μm, and the fluorine concentration is 19%. Apart from these, the rest of Embodiment 4 is the same as Embodiment 3.

In one embodiment, the peel strength between the prepared backing layer 101 and sliding layer 103 of the sliding bearing is 3.10 N/mm.

Embodiment 5

In one embodiment, in the bonding layer 102, the depth of the fluorination treatment is 0.1 μm and the fluorine concentration is 5%. Apart from these, the rest of Embodiment 5 is the same as Embodiment 3.

In one embodiment, the peel strength between the prepared backing layer 101 and sliding layer 103 of the sliding bearing is 2.84 N/mm.

Embodiment 6

In one embodiment, the bonding layer 102, with a thickness of 0.045 mm, is a polyamide-6-film, 2% (mass fraction) of which is graphite. Apart from this, the rest of Embodiment 6 is the same as Embodiment 1.

In one embodiment, the peel strength between the prepared backing layer 101 and sliding layer 103 of the sliding bearing is 2.12 N/mm.

Embodiment 7

In one embodiment, the bonding layer 102, with a thickness of 0.05 mm, is a thermoplastic polyurethane film, 2% (mass fraction) of which is silicon dioxide. Apart from this, the rest of Embodiment 7 is the same as Embodiment 1.

In one embodiment, the peel strength between the prepared backing layer 101 and sliding layer 103 of the sliding bearing is 3.53 N/mm.

Embodiment 8

In one embodiment, the bonding layer has a fluorine concentration of 52%. Apart from this, the rest of Embodiment 8 is the same as Embodiment 1.

In one embodiment, the peel strength between the prepared backing layer 101 and sliding layer 103 of the sliding bearing is 1.54 N/mm.

Comparable Example 1

The fluorination treatment is not performed on either the first bonding surface 102a or the second bonding surface 102b of the bonding layer 102. Apart from this, the rest of Comparable example 1 is the same as Embodiment 1.

The peel strength between the prepared backing layer 101 and sliding layer 103 of the sliding bearing is 0.58 N/mm.

Comparable Example 2

The fluorination treatment is not performed on either the first bonding surface 102a or the second bonding surface 102b of the bonding layer 102. Apart from this, the rest of Comparable example 2 is the same as Embodiment 2.

The peel strength between the prepared backing layer 101 and sliding layer 103 of the sliding bearing is 1.07 N/mm.

Comparable Example 3

The bonding layer 102 is an ethylene-tetrafluoroethylene copolymer with a thickness of 0.05 mm and its surface is not fluorination-treated. Apart from these, the rest of Comparable example 3 is the same as Embodiment 2.

The peel strength between the prepared backing layer 101 and sliding layer 103 of the sliding bearing is 1.98 N/mm.

All embodiments and comparable examples are incorporated into and shown in FIG. 4.

It is evident from the above embodiments and comparable examples in the present disclosure that the bonding layer containing a fluorination-treated layer and the sliding layer have a bond strength between them that is significantly increased as compared to with a bonding layer that is not fluorination-treated, and have an equal or better peel strength as compared to a bonding layer composed of a fluorine-containing polymer. In some embodiments, the sliding bearing of the disclosure, on the condition that the effective combination between the sliding layer and the backing layer is secured, uses a bonding layer that is an ordinary thermoplastic film only containing an appropriate amount of fluorine within a certain depth range under its surface, thereby reducing costs as compared with using the expensive fluorine-containing polymer as the bonding layer. Moreover, the realization of low fluorine content of the bonding layer abates environment pollution. Additionally, the preparation method of the sliding bearing in the present disclosure is easy, and can be applied to industrial production.

What is claimed is:

1. A sliding bearing comprising:
   a backing layer comprising a first surface and a second surface on the back of the first surface;
   a bonding layer covering the backing layer and comprising a first bonding surface in contact with the second surface of the backing layer and a second bonding surface on the back of the first bonding surface; and
   a sliding layer covering the bonding layer and comprising a first surface in contact with the second bonding surface of the bonding layer and a second surface on the back of the first surface of the sliding layer;
   wherein the bonding layer comprises a fluorine-free thermoplastic resin and a fluorination-treated layer formed by subjecting the resin to a fluorination treatment on at least the second bonding surface; and
   the sliding layer comprises polytetrafluoroethylene.

2. The sliding bearing according to claim 1, wherein the bonding layer further comprises another fluorination-treated layer formed by subjecting the resin to a fluorination treatment on the first bonding surface.

3. The sliding bearing according to claim 1, wherein the fluorination-treated layer has a depth of 0.001~50 μm.

4. The sliding bearing according to claim 3, wherein the fluorination-treated layer has a depth of 0.1~15 μm.

5. The sliding bearing according to claim 1, wherein the fluorine in the fluorination-treated layer has a relative atomic concentration of 1~80%, and the concentration of the fluorine is obtained through analysis by an X-ray photoelectron spectrometer.

6. The sliding bearing according to claim 5, wherein the fluorine has a relative atomic concentration of 5~52%.

7. The sliding bearing according to claim 1, wherein the thermoplastic resin has a melting point of 330° C. or lower.

8. The sliding bearing according to claim 1, wherein the thermoplastic resin is selected from one or more of polyethylene, polypropylene, ethylene-vinyl acetate copolymer, polyurethane, polyamide, polyethylene terephthalate, polybutylene terephthalate, and polyphenylene sulfide.

9. The sliding bearing according to claim 8, wherein the thermoplastic resin is selected from one or more of ethylene-vinyl acetate copolymer, polyurethane, polyamide, and polyphenylene sulfide.

10. The sliding bearing according to claim 1, wherein a mass fraction of the thermoplastic resin in the bonding layer is 40~100%.

11. The sliding bearing according to claim 1, wherein the bonding layer further comprises:
    a filler for the bonding layer selected from a graft modified polymer, inorganic powder or a combination thereof;
    wherein the graft modified polymer is selected from one or more of anhydride grafted polyethylene, anhydride grafted polypropylene, and acrylate grafted polypropylene; and
    the inorganic powder is selected from one or more of graphite, graphene, carbon nano tube, and silicon dioxide.

12. The sliding bearing according to claim 1, wherein the bonding layer has a thickness of 0.005~0.1 mm.

13. The sliding bearing according to claim 12, wherein the bonding layer has a thickness of 0.02~0.06 mm.

14. The sliding bearing according to claim 1, wherein a mass fraction of the polytetrafluoroethylene in the sliding layer is 20~100%.

15. The sliding bearing according to claim 14, wherein the mass fraction of the polytetrafluoroethylene in the sliding layer is 60~90%.

16. The sliding bearing according to claim 1, wherein the sliding layer further comprises a filler for the sliding layer selected from solid lubricants, abrasion resistance improvers, reinforcements, polymers or a mixture thereof;
    wherein the solid lubricants are selected from one or more of graphite, graphite fluoride, graphene, carbon nano tube, molybdenum disulfide, and tungsten disulfide;
    the abrasion resistance improvers are selected from one or more of copper, plumbum, copper sulfide, zinc sulfide, barium sulfate, ferric sulfide, chromium oxide, aluminum oxide, zirconium oxide, silicon carbide, silicon nitride, boron nitride, and glass beads;
    the reinforcements are selected from one or more of glass fibers, carbon fibers, aramid fibers, polyether-etherketone fibers, and polyimide fibers; and
    the polymers are selected from one or more of polyamide, polyphenyl ester, polyphenylene sulfide, polyether ether ketone, polyimide, polyamide-imide, polyvinylidene fluoride, ethylene-tetrafluoroethylene copolymer, fluorinated ethylene-propylene copolymer, and tetrafluoroethylene-perfluoalkoxyvinyl ether copolymer.

17. The sliding bearing according to claim 1, wherein the first surface of the sliding layer is a surface subject to surface treatment.

18. The sliding bearing according to claim 17, wherein the surface treatment includes chemical modification treatment, plasma treatment, corona treatment, flame treatment, and laser radiation treatment.

19. A method for preparing the sliding bearing according to claim 1, the method comprising:
- performing the fluorination treatment on at least the second bonding surface of the bonding layer;
- placing the first bonding surface of the bonding layer on the second surface of the backing layer and then placing the first surface of the sliding layer on the second bonding surface of the bonding layer to form a laminated assembly;
- heating and pressurizing the laminated assembly; and
- cooling the laminated assembly in a pressurized state.

* * * * *